H. S. Palmer,
Hay Loader.
No. 58282 — Patented Sep. 25, 1866.
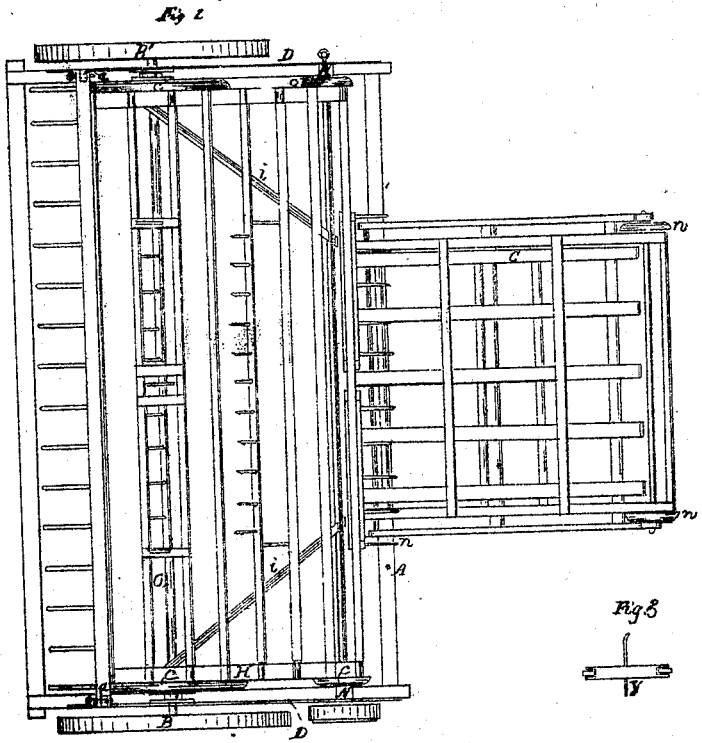
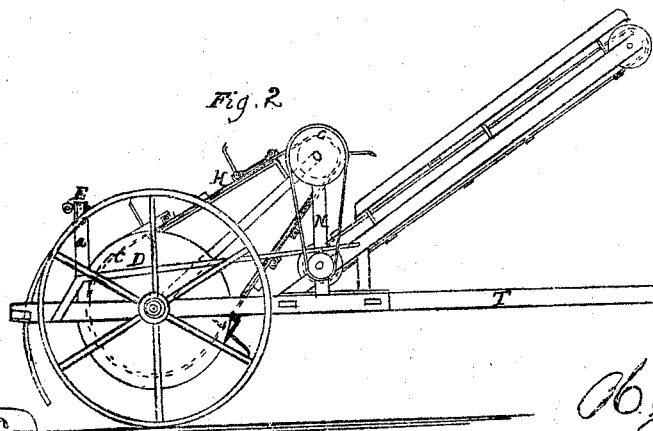
Witnesses.
Inventor:
H. S. Palmer

UNITED STATES PATENT OFFICE

H. S. PALMER, OF NORWELL, MICHIGAN.

IMPROVEMENT IN MACHINES FOR RAKING AND LOADING HAY.

Specification forming part of Letters Patent No. 58,282, dated September 25, 1866.

*To all whom it may concern:*

Be it known that I, H. S. PALMER, of Norwell, Jackson county, and State of Michigan, have invented a new and Improved Device for Raking and Loading Hay; and I do hereby declare that the following is a full, clear, and exact description thereof, which will enable others skilled in the art to make and use the same, reference being had to the accompanying drawings, forming part of this specification.

The nature of my invention consists in so combining an elevator to a hay-rake that hay may be raked, and at the same time elevated and deposited upon the load.

It further consists in providing or constructing a portion of the elevator in sections in such a manner that they will recede from each other while upon the ground and approach each other while being elevated, so that a much wider space is raked over than the load or wagon is wide. Thus, while the hay is being elevated, it is brought transversely to the load and deposited thereon, by which means a great amount of time and labor is saved, and the work done in the most rapid and perfect manner.

Figure 1 is a top-plan view of my improved device for raking and loading hay. Fig. 2 is a side elevation of same. Fig. 3 is an end view of the reciprocating portion of the apron.

Similar letters of reference indicate corresponding parts.

To enable others skilled in the art to make and use my invention, I will proceed to describe its construction and operation.

A represents a frame, made of wood or other suitable material, of a rectangular form, hung in suitable bearings at each end of the shaft O, and immediately inside the wheels B B'. At a convenient point back of the wheels are posts $a$ $a$ extending up from the cross-pieces of the frame A, by which the head of the rake E is attached to the said posts.

H is an endless flexible apron, made of belts and slats, which run over the pulleys $c$ $c$. Some of the slats forming the apron are provided with teeth for the purpose of taking the hay from the rake, and elevating and depositing it upon the endless flexible apron C, which is also provided with slats and runs over the pulleys $n$ $n$.

D D are levers rigidly secured to the back or rear portion of the frame A, and extend forward to a convenient distance for the purpose of elevating and lowering the teeth of the rake, by which it may be secured in any desired position upon the posts N N.

It will here be observed that the flexible apron H is also provided with racks or rakes, and secured to the said apron in such a manner as to allow them to slide or work freely from one end of the apron to the center, where they meet, so that while the machine is in motion they recede and approach each other by a regular reciprocating motion, produced by means of the rods $i$ $i$ and pins or teeth $y$, in Fig. 3.

T is the tongue or pole by which my improved device is secured or attached to the wagon or cart, and by which it is guided.

The operation consists simply in attaching the device to the rear end of a wagon or cart and lowering the rake by means of the levers D D, so that it will have a proper bearing upon the ground, then by driving the wagon or cart along will put the endless apron in motion, which is imparted from the pulleys, which are rigidly secured upon the axle or shaft O, to which the traction-wheels B B are attached; and as the hay accumulates and gathers in front of the rake-teeth it is taken by the teeth upon the endless apron H, elevated, and deposited upon the apron C, and from that it is elevated and deposited upon the load.

It will be understood that the sections or portions of the endless apron containing the teeth are made to recede and approach each other by means of the pin Y and rods $i$ $i$, for the purpose of raking a wider space than the load, so that when the teeth are taking the hay from the rake they have receded to their greatest distance, and as they are elevated they approach each other by means of the pins Y coming in contact with the rods $i$ $i$. And by this means the hay is brought transversely to the load, elevated, and deposited thereon, by which means hay may be gathered and deposited upon the wagon or cart in the most rapid and successful manner.

Having thus described my invention, what I claim as new, and desire to secure by Letters Patent, is—

The endless flexible apron or elevator, provided with reciprocating teeth, as above described, in combination with a rake for gathering and depositing hay upon the load, for the purposes and substantially as set forth.

H. S. PALMER.

Witnesses:
  O. L. RIDER,
  C. F. E. LUCE.